United States Patent [19]

Goto

[11] Patent Number: 5,064,176

[45] Date of Patent: Nov. 12, 1991

[54] UPPER SUPPORT FOR SHOCK ABSORBER IN SUSPENSION SYSTEM

[75] Inventor: Katsuhiro Goto, Komaki, Japan

[73] Assignee: Tokai Rubber Industries, Ltd., Aichi, Japan

[21] Appl. No.: 503,944

[22] Filed: Apr. 4, 1990

[30] Foreign Application Priority Data

Apr. 14, 1989 [JP] Japan .................................. 1-95800

[51] Int. Cl.$^5$ ........................ B60G 15/04; F16F 7/10
[52] U.S. Cl. ................................ 267/140.1; 267/219
[58] Field of Search ............ 267/140.1 A, 140.1 L, 267/140.1 R, 219, 35; 208/560, 563, 636

[56] References Cited

U.S. PATENT DOCUMENTS

| | | | |
|---|---|---|---|
| 2,432,050 | 12/1947 | Thiry | 267/140.1 A |
| 4,288,063 | 9/1981 | Brenner et al. | 267/140.1 A |
| 4,733,854 | 3/1988 | Miyamoto | 267/140 |
| 4,789,144 | 12/1988 | Brenner | 267/140.1 A |
| 4,844,430 | 7/1989 | Miya et al. | 267/140.1 C |
| 4,865,299 | 9/1989 | Goto | 267/140.1 C |

FOREIGN PATENT DOCUMENTS

| | | |
|---|---|---|
| 0255434 | 2/1988 | European Pat. Off. . |
| 3826302 | 2/1989 | Fed. Rep. of Germany . |
| 0176802 | 9/1985 | Japan ................................. 267/220 |
| 0197834 | 9/1986 | Japan ................................. 267/219 |
| 0224744 | 10/1987 | Japan ........................... 267/140.1 C |
| 0205503 | 9/1988 | Japan ................................. 267/220 |

*Primary Examiner*—Matthew C. Graham

[57] ABSTRACT

An upper support for a suspension system, including a generally cylindrical inner rigid member, a generally cylindrical outer rigid member, and at least one generally annular elastic body which is interposed between the inner and outer rigid members for elastically connecting these members, and which at least partially defines at least one fluid chamber that is filled with a non-compressible fluid. The upper support further includes at least one resonance member each of which is accommodated in the corresponding fluid chamber and has an outer configuration substantially corresponding to an inner shape of the corresponding fluid chamber. Each resonance member is supported by the inner rigid member or the outer rigid member, and cooperates with an inner wall surface of the corresponding fluid chamber to define a resonance portion which has predetermined dimensions, and through which the non-compressible fluid is forced to flow upon application of a dynamic vibrational load.

10 Claims, 5 Drawing Sheets

UPPER SUPPORT FOR SHOCK ABSORBER IN SUSPENSION SYSTEM

BACKGROUND OF THE INVENTION

1. Field of the Invention

The present invention relates in general to an upper support used in a suspension system of a motor vehicle, for elastically connecting a body of the vehicle and a shock absorber of the vehicle, and more particularly to such an upper support which has improved vibration-isolating capability while assuring high steering stability of the vehicle.

2. Discussion of the Prior Art

In a conventional suspension system of a motor vehicle, a generally cylindrical upper support is usually interposed between a body of the vehicle and a piston rod of a shock absorber which is linked with an axle or arm for supporting vehicle wheels. Such an upper support is adapted to prevent input vibrations received from the wheels through the shock absorber from being transmitted to the vehicle body, for example. The upper support generally consists of a cylindrical inner rigid member to which the piston rod of the shock absorber is fixed, a cylindrical outer rigid member which is disposed radially outwardly of the inner rigid member and fixed to the vehicle body, and an elastic body interposed between the inner and outer rigid members for elastically connecting the two members.

The upper support as described above is required to be given a soft spring characteristic for improved vibration-isolating capability, for the purpose of preventing transmission of the vibrations from the shock absorber toward the vehicle body. At the same time, the upper support is required to exhibit a high degree of stiffness so as to minimize the amount of deformation thereof with respect to a static load applied thereto, for the purposes of avoiding changes in the posture of the vehicle while the vehicle is turning, braked, or rapidly accelerated or decelerated, and thus assuring high steering stability of the vehicle.

To meet the above requirements, the upper support utilizes its dynamic spring or elastic characteristic to enhance the vibration-isolating capability, and its static spring or elastic characteristic to enhance the steering stability of the vehicle.

However, it is extremely difficult for the known upper support to fully satisfy these requirements for the vibration-isolating capability and the steering stability, since the known upper support relies only on the elastic deformation of the elastic body for isolating the input vibrations. Namely, since there is a predetermined correlation between the dynamic and static spring constant characteristics of the elastic body, it is impossible for the upper support to be given a soft dynamic spring characteristic, without exhibiting a soft static spring characteristic. Further, since the upper support in particular is likely to receive a relatively large static load during use, the elastic body must be made of a rubber material having a relatively high static spring constant, which inevitably causes stiffening of the dynamic spring characteristic of the upper support. It is also to be noted that the dynamic spring constant of the elastic body tends to increase with an increase in the frequency of the input dynamic vibrations, while at the same time the upper support should function to insulate vibrations with relatively high frequencies around 100–300 Hz, such as road-oriented noises. Accordingly, the known upper support suffers from an extremely high dynamic spring constant when it is subjected to the high-frequency vibrations.

SUMMARY OF THE INVENTION

It is accordingly an object of the present invention to provide an upper support for a suspension system of a motor vehicle, which is capable of exhibiting excellent vibration-isolating capability while assuring high steering stability of the vehicle.

The above object may be accomplished according to the principle of the present invention, which provides an upper support for a suspension system, which is interposed between a body of a vehicle and a shock absorber of the vehicle, for elastically connecting the vehicle body and the shock absorber, comprising (a) a generally cylindrical inner rigid member to which the shock absorber is fixed; (b) a generally cylindrical outer rigid member which is disposed radially outwardly of the inner rigid member and fixed to the body of the vehicle; (c) at least one generally annular elastic body interposed between the inner and outer rigid members for elastically connecting the inner and outer rigid members, the at least one elastic body at least partially defining at least one fluid chamber which is filled with a non-compressible fluid and which is subject to a dynamic vibrational load that is applied between the inner and outer rigid members; and (d) at least one resonance member each of which is accommodated in the corresponding one of the at least one fluid chamber and has an outer configuration substantially corresponding to an inner shape of the corresponding one fluid chamber. Each resonance member is supported by one of the inner rigid member and the outer rigid member, and cooperates with an inner wall surface of the corresponding fluid chamber to define a resonance portion which has predetermined dimensions, and through which the non-compressible fluid is forced to flow upon application of the dynamic vibrational load.

In the upper support of the present invention constructed as described above, when the dynamic vibrations are applied between the inner and outer rigid members, the elastic deformation of the elastic bodies causes the non-compressible fluid to flow within each fluid chamber through the resonance portion formed around the corresponding resonance member.

The present upper support having the above arrangement can provide an effectively reduced dynamic spring constant with respect to relatively high-frequency vibrations, based on flows of the fluid through the resonance portion of the fluid chamber, without significantly lowering its static spring constant. Thus, the upper support of the invention exhibits excellent vibration-isolating capability while assuring a sufficient degree of steering stability of the vehicle.

In one form of the present invention, the above-indicated at least one fluid chamber comprises a single annular fluid chamber which is formed over the entire circumference of the above-indicated at least one generally annular elastic body between the inner and outer rigid members, and the above-indicated at least one resonance member comprises a single annular member which is accommodated within the single annular fluid chamber. This arrangement makes it possible to produce the upper support having excellent vibration-isolating capability, with improved accuracy and economy.

According to one feature of the above form of the invention, the above-indicated at least one generally annular elastic body comprises a first elastic body and a second elastic body. One of the first and second elastic bodies has an annular recess which is open toward the other elastic body in the axial direction of the upper support, and which is substantially closed by the other elastic body to provide the single annular fluid chamber. In this case, the upper support may further includes an inner support member and an outer support member for supporting the other elastic body, such that the inner and outer support members are respectively fixed to the inner and outer rigid members to connect the other elastic body to the inner and outer rigid members.

According to another feature of the above form of the invention, the above-indicated at least one generally annular elastic body comprises a pair of elastic bodies, each one of which has an annular recess which is open toward the other elastic body in the axial direction of the upper support, the single annular fluid chamber being at least partially defined by the annular recesses of the pair of elastic bodies. In this case, the upper support may further include a pair of inner support members and a pair of outer support members for supporting the pair of elastic bodies, such that the pair of inner support members are fixed to the inner rigid member, while the pair of outer support members are fixed to the outer rigid member, so as to connect the pair of elastic bodies to the inner and outer rigid members.

The non-compressible fluid filling the fluid chamber generally has a kinematic viscosity of not higher than 1000 centistokes, preferably not higher than 500 centistokes, and most preferably not higher than 100 centistokes.

Preferably, the predetermined dimensions of the resonance portion are determined so that the upper support exhibits an absolute value of complex spring constant lower than 200 kgf/mm, with respect to the dynamic vibrational load having frequencies up to 500 Hz.

BRIEF DESCRIPTION OF THE DRAWINGS

The above and optional objects, features and advantages of the present invention will be better understood by reading the following description of a presently preferred embodiment of the invention, when considered in conjunction with the accompanying drawings, in which.

DETAILED DESCRIPTION OF THE PREFERRED EMBODIMENTS

Figure 1:
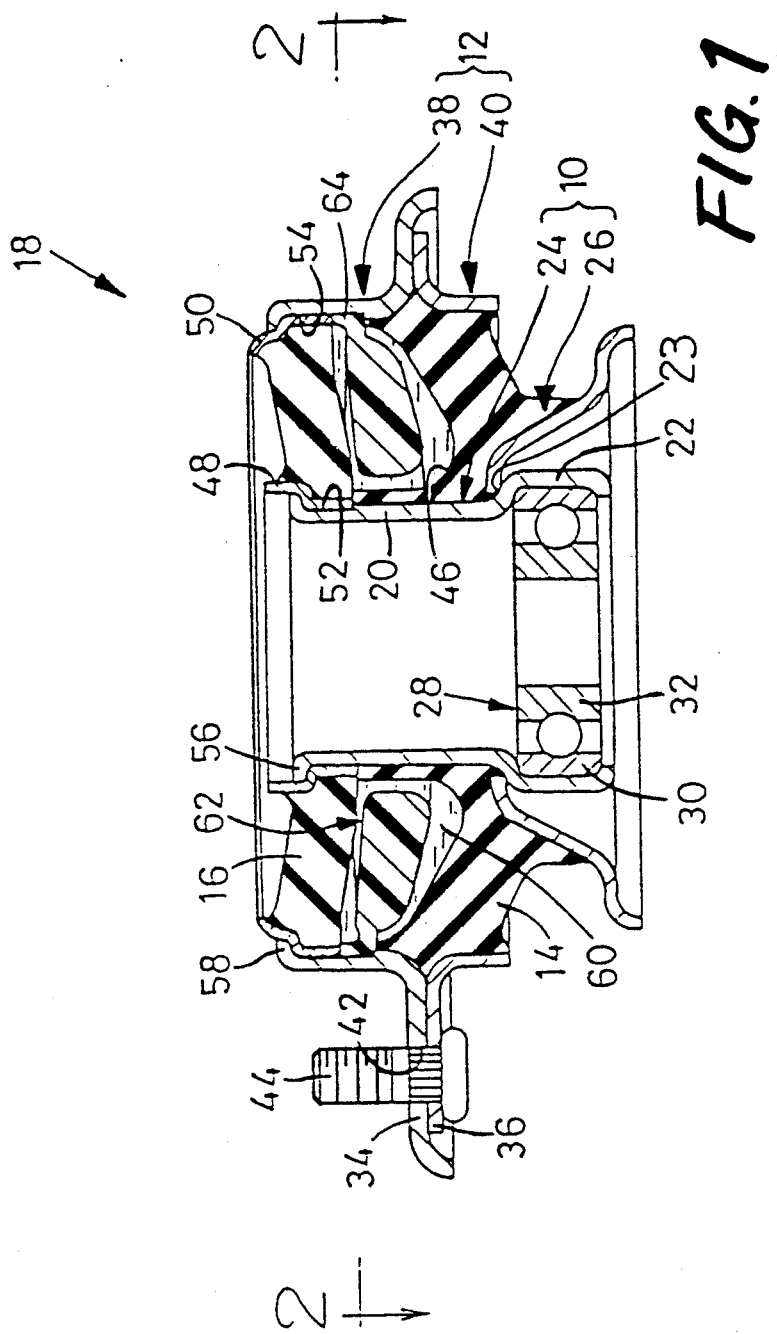
FIG. 1 is an elevational view in axial cross section of one embodiment of an upper support constructed according to the present invention.
Figure 2:
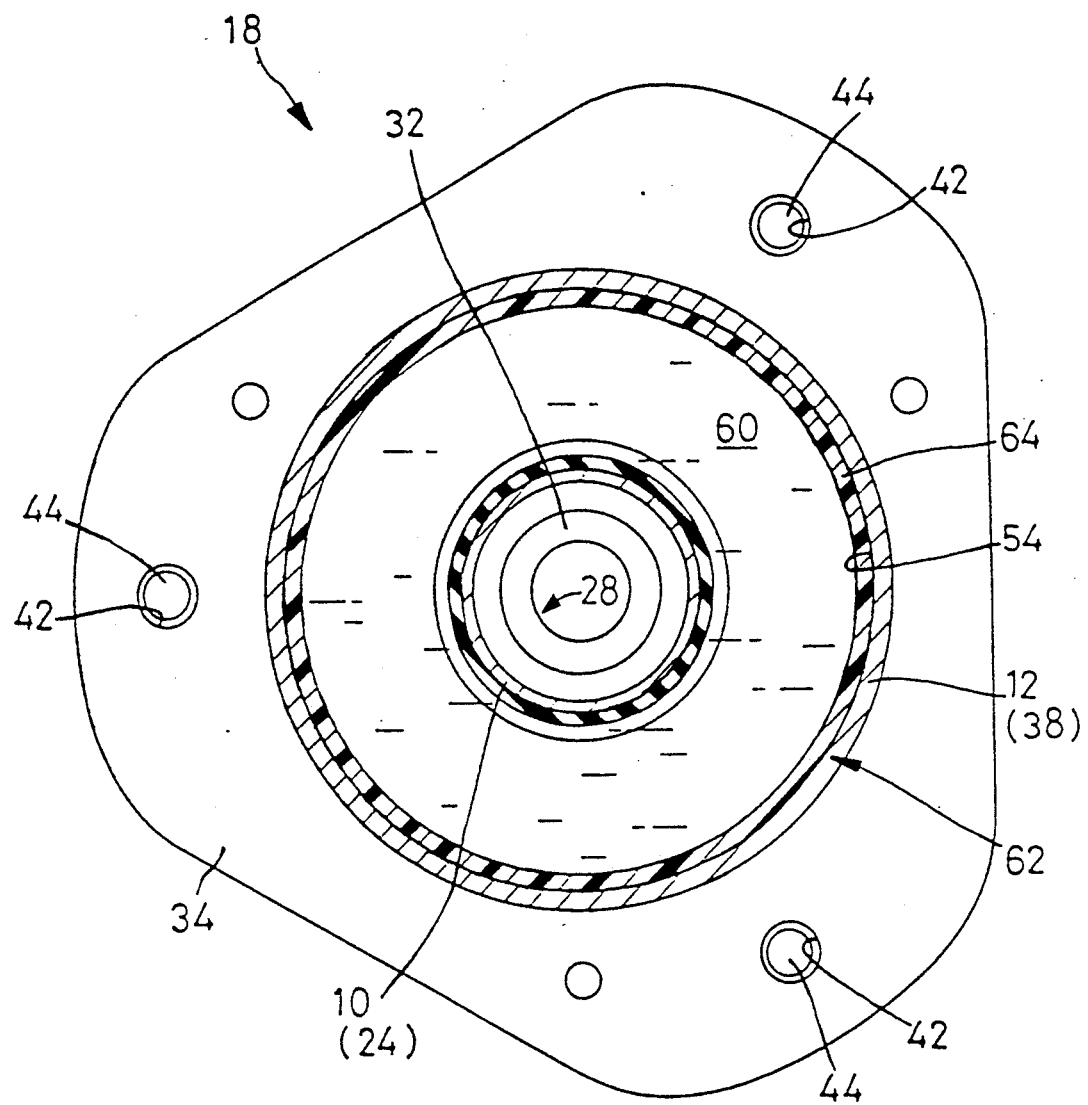
FIG. 2 is a transverse cross sectional view taken along line 2—2 of FIG. 1.

Referring first to FIGS. 1 and 2, there is illustrated the preferred embodiment of the invention in the form of a cylindrical upper support 18 used in a front axle suspension system of a motor vehicle. In these figures, reference numeral 10 denotes a generally cylindrical inner rigid member in the form of an inner metal assembly, while reference numeral 12 denotes a generally cylindrical outer rigid member in the form of an outer metal assembly, which is disposed substantially coaxially with and radially outwardly of the inner metal assembly 10, with a suitable spacing therebetween. Between the inner and outer metal assemblies 10, 12, there are interposed two elastic bodies in the form of generally cylindrical and annular rubber bodies 14, 16 made of a suitable rubber material, which are adapted to elastically connect the inner and outer metal assemblies 10, 12. In the present embodiment, the inner metal assembly 10 is fixed to a shock absorber (not shown) of the suspension system, while the outer metal assembly 12 is fixed to the vehicle body. Thus, the instant upper support 18 is interposed between the shock absorber and the vehicle body, for elastically connecting these members in a vibration damping or isolating manner.

More specifically described, the cylindrical inner metal assembly 10 consists of a stepped inner member 24 having a generally cylindrical shape, and a tapered outer member 26. The stepped inner member 24 includes a small-diameter portion 20, a large-diameter portion 22 and a shoulder portion 23 connecting these portions 20, 22. The tapered outer member 26 is disposed radially outwardly of the large-diameter portion 22 of the stepped inner member 24, such that the tapered outer member 26 is welded at its one axial end having the smaller diameter to the outer circumferential surface of the shoulder portion 23 of the stepped inner member 24.

The upper support 18 further includes a bearing 28 which is fitted in the large-diameter portion 22 of the stepped inner member 24 of the inner metal assembly 10. The open end portion of the large-diameter portion 22 is caulked against an outer ring 30 of the bearing 28, so that the bearing 28 is fixedly attached to the inner circumferential surface of the large-diameter portion 22 of the stepped inner member 24. A piston rod (not shown) of the shock absorber is inserted through and fixedly supported by an inner ring 32 of the bearing 28, whereby the piston rod is attached to the inner metal assembly 10 (stepped inner member 24) such that the piston rod is rotatable about its axis relative to the inner metal assembly 10.

On the other hand, the outer metal assembly 12 consists of an upper cylindrical member 38 and a lower cylindrical member 40, which are superposed on each other in the axial direction of the upper support 18. The upper cylindrical member 38 has a radially outward flange 34 formed integrally at its one axial end adjacent to the lower cylindrical member 40, while the lower cylindrical member 40 has a radially outward flange 36 formed integrally at its one axial end adjacent to the upper cylindrical member 38. These outward flanges 34, 36 are superposed on each other as shown in FIG. 1, so that the upper and lower cylindrical members 38, 40 are fixed together into the outer cylindrical assembly 12, in a substantially coaxial relationship with each other. The superposed flanges 34, 36 have three holes 42 formed therethrough, which are substantially equally spaced apart from each other in the circumferential direction of the upper support 18, as shown in FIG. 2. The outer metal assembly 12 is secured to the vehicle body, by means of mounting bolts 44 which extend through the holes 42 formed through the outer metal assembly 12.

The outer metal assembly 12 as described above is disposed substantially coaxially with and radially outwardly of the inner metal assembly 10, with a suitable spacing therebetween. Between these inner and outer metal assemblies 10, 12, there are interposed the generally cylindrical or annular rubber bodies 14, 16, which are arranged in the axial direction of the upper support 18, and which are adapted to integrally and elastically connect the inner and outer metal assemblies 10, 12.

More specifically, one of the rubber bodies 14 is disposed on the side of the large-diameter portion 22 of the stepped inner member 24 as viewed in the axial direction of the upper support 18. The inner circumferential surface of the rubber body 14 is secured by vulcanization to the outer circumferential surfaces of the stepped inner member 24 and tapered outer member 26 of the inner metal assembly 10, while the outer circumferential surface of the rubber body 14 is secured by vulcanization to the inner circumferential surfaces of the upper and lower cylindrical members 38, 40 of the outer metal assembly 12. Thus, an integral intermediate product incorporating the inner and outer metal assemblies 10, 12 and the rubber body 14 is obtained. The rubber body 14 has an annular recess 46 which is open to one of its axial ends remote from the large-diameter portion 22, and which extends over the entire circumference thereof.

The other rubber body 16 is disposed on the side of the small-diameter portion 20 of the stepped inner member 24 as viewed in the axial direction of the upper support 18. The inner and outer circumferential surfaces of the rubber body 16 are respectively secured by vulcanization to an inner and an outer support member 48, 50 each having a stepped cylindrical shape. The inner support member 48 is fitted on the axial end portion of the stepped inner member 24 which is remote from the large-diameter portion 22, while the outer support member 50 is fitted in the axial end portion of the upper cylindrical member 38 which is remote from the outward flange 34. Thus, the rubber body 16 is interposed between the stepped inner member 20 and the upper cylindrical member 38, that is, between the inner and outer metal assemblies 10, 12.

More specifically, the stepped inner member 24 has a recessed portion 52 formed in the outer circumferential surface of the axial end portion thereof on which the inner support member 48 is fitted, so that the axially inner portion of the inner support member 48 is axially gripped by and between an inner axial end face of the recessed portion 52 and a caulked portion 56 formed at the extreme end of the above-indicated axial end portion of the stepped inner member 24. Namely, the caulked portion 56 partially defines the recessed portion 52. On the other hand, the upper cylindrical member 38 has a recessed portion 54 formed in the inner circumferential surface of the axial end portion thereof in which the outer support member 50 is fitted, so that the axially inner portion of the outer support member 50 is axially gripped by and between an outer axial end face of a fixed end portion 64 of a resonance block 62 (which will be described), and a caulked portion 58 formed at the extreme end of the above-indicated axial end portion of the upper cylindrical member 38. The caulked portion 58 partially defines the recessed portion 54.

In the manner as described above, the rubber body 16 is assembled with and interposed between the inner and outer metal assemblies 10, 12. Consequently, the opening of the annular recess 46 formed in the rubber body 14 is closed by the rubber body 16, whereby there is defined a fluid-tightly enclosed annular fluid chamber 60 between the inner wall surface of the annular recess 46 and the lower surface of the rubber body 16.

The fluid chamber 60 is filled with a suitable non-compressible fluid by effecting the assembling of the two rubber bodies 14, 16 and the inner and outer metal assemblies 10, 12 within a mass of the non-compressible fluid, for example. It is preferable that the non-compressible fluid has a kinematic viscosity of not higher than 1000 centistokes, more preferably not higher than 500 centistokes, and most preferably not higher than 100 centistokes, so as to assure a sufficient degree of fluidity of the fluid. For example, a non-compressible fluid such as water, ethylene glycol, propylene glycol, or other alkylene glycol, polyalkylene glycol or silicone oil having low kinematic viscosity, or mixture thereof is preferably employed.

Upon assembling of the rubber body 16 with the inner and outer metal assemblies 10, 12, an annular resonance member in the form of the resonance block 62 is accommodated within the fluid chamber 60. The resonance block 62 has an outer configuration substantially corresponding or similar to the inner shape of the fluid chamber 60, and the dimensions of the outer surface of the resonance block 62 are smaller by a suitable value than those of the fluid chamber 60. The resonance block 62 is formed at its outer periphery with the annular fixed portion 64, which extends over the entire circumference of the block 62. This fixed portion 64 of the resonance block 62 is fixed in the above-indicated recessed portion 54 formed in the upper cylindrical member 38, such that the fixed portion 64 is axially gripped by and between an inner axial end face of the recessed portion 54 and an inner axial end face of the outer support member 50. Thus, the resonance block 62 is positioned in place within the fluid chamber 60, such that its fixed portion 64 is fixedly supported by the upper cylindrical member 38, i.e., by the outer metal assembly 12. The resonance block 62 may be made of any material provided it is unlikely to be deformed and is sufficiently resistant to corrosion by the fluid within the fluid chamber 60. For example, materials such as metal, resin and highly elastic rubber may be preferably used for the resonance block 62.

Figure 3:
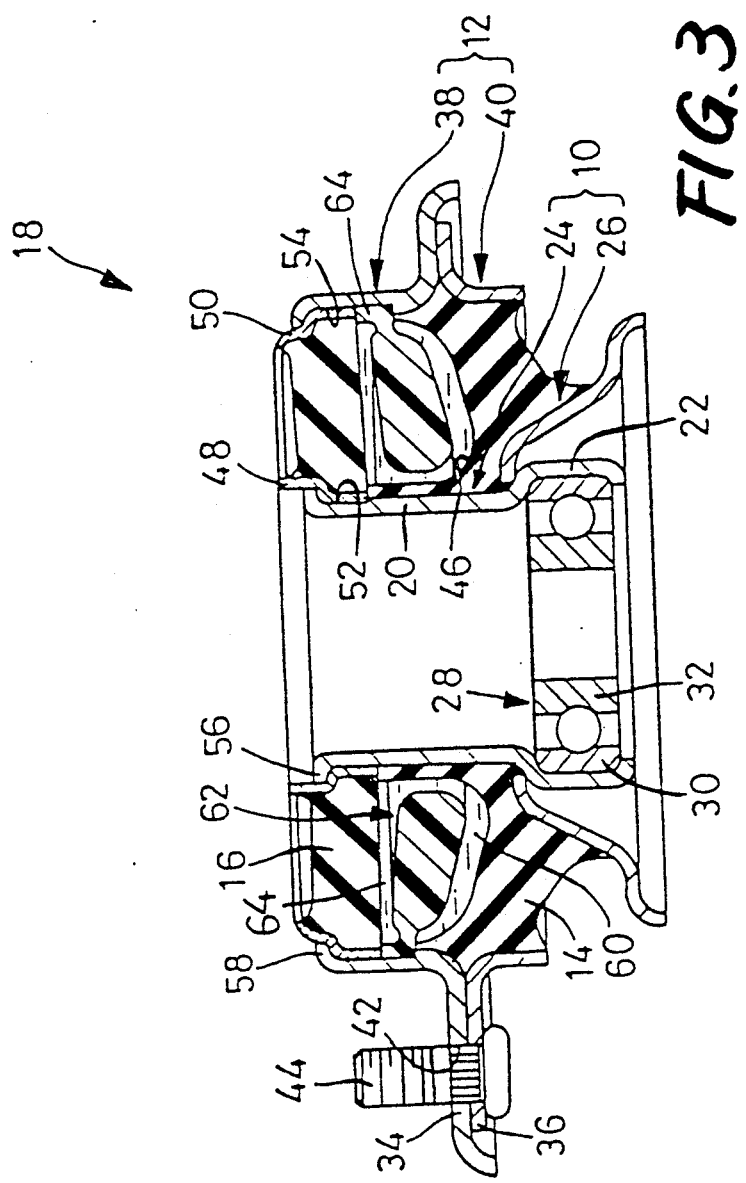
FIG. 3 is an elevational view in axial cross section of the upper support of FIG. 1, when the upper support is installed on a motor vehicle.

With the upper support 18 installed on the motor vehicle, a static load of the vehicle body is applied between the inner and outer metal assemblies 10, 12, causing the rubber bodies 14, 16 to be deformed, whereby a relative displacement takes place between the inner and outer metal assemblies 10, 12 by a predetermined distance in the axial direction thereof. Consequently, the resonance block 62 is positioned in an axially intermediate portion of the fluid chamber 60, as shown in FIG. 3. In this state, a resonance portion 64 having a suitable clearance is defined between the outer surface of the resonance block 62, and the inner wall surface of the fluid chamber 60, i.e., the surfaces of the rubber bodies 14, 16 defining the fluid chamber 60.

Figure 4:
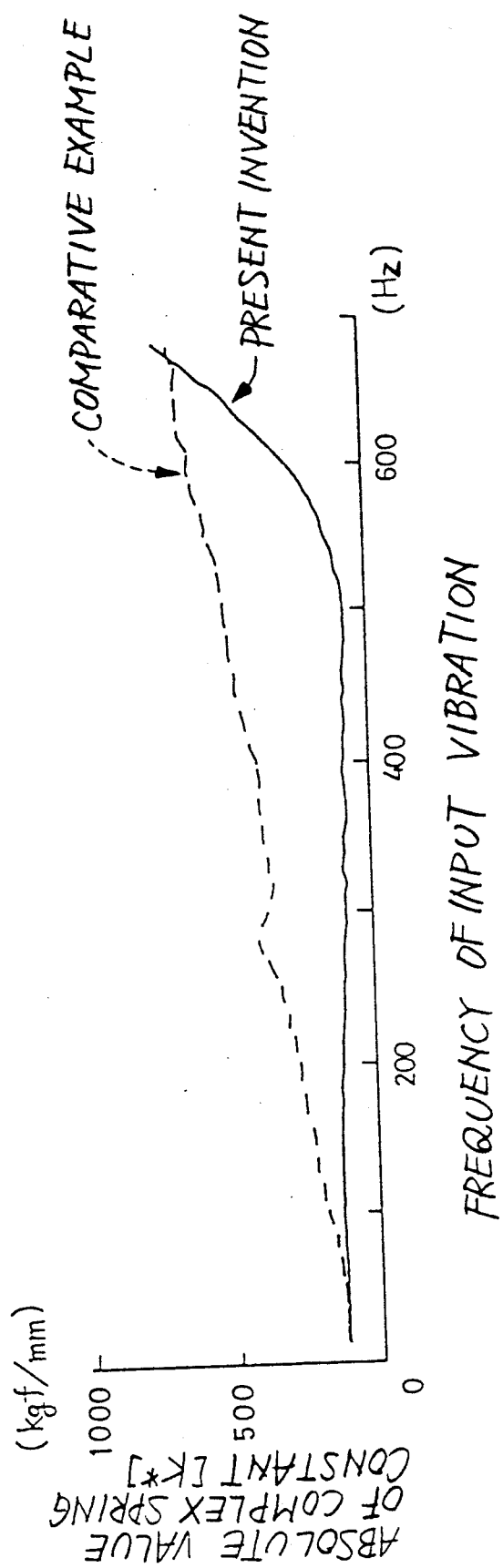
FIG. 4 a graph showing the relationship between frequencies of applied vibrations and the absolute value of complex spring constant of the upper support of FIG. 1, together with the same relationship associated with a known upper support.

In the thus constructed upper support 18, a dynamic vibrational load is applied from the shock absorber toward between the inner and outer metal assemblies 10, 12, while the upper support 18 is installed on the motor vehicle. In this case, the upper support 18 exhibits considerably distinguished characteristics for isolating the input vibrations in a predetermined frequency range, as shown in the graph of FIG. 4. More specifically, the dynamic spring constant of the upper support 18 is maintained at a substantially constant low value, or even reduced with the increase in the frequency of the input vibrations. In the graph of FIG. 4, the solid line represents the relationship between the absolute value of complex spring constant or stiffness of the instant upper support 18 and the frequencies of the applied vibrations, while the dashed line represents the same relationship associated with a conventional comparative upper support having no fluid chamber. It will be apparent from the graph that the dynamic spring constant of this comparative upper support is certainly increased with the increase in the frequency of the input vibrations. It follows from the above description that the instant upper support 18 can exhibit far more excellent vibration isolating characteristics over a wide frequency range of vibrations, as compared with the conventional counterpart.

Although the operation and principle of the instant upper support 18 with the above vibration isolating effect have not been fully explicated, it is presumed that when a vibrational load is applied between the inner and outer metal assemblies 10, 12, the elastic deformation of the rubber bodies 14, 16 induces a predetermined degree of a pressure gradient in the resonance portion 64 formed around the resonance block 62, whereby the fluid in the fluid chamber 60 is forced to flow through the resonance portion 64. These flows of the fluid give rise to flow resistance in the resonance portion 64, due to the force of inertia of the fluid mass, and the flow resistance acts to reduce the amount of transmission of input vibrations through the rubber bodies 14, 16, due to a phase difference between the resonance vibrations of the fluid mass and the input vibrations in the predetermined frequency range indicated above.

The predetermined frequency range of the vibrations for which the instant upper support 18 exhibits the low dynamic spring constant can be suitably determined by adjusting the dimensions of the resonance portion 64 formed around the resonance block 62, depending upon the modulus of elasticity of the rubber bodies 14, 16, the weight (specific gravity) of the resonance block 62 and the kinematic viscosity of the fluid in the fluid chamber 60. Thus, the upper support 18 exhibits a sufficiently low dynamic spring constant, preferably lower than 200 kgf/mm (absolute value of complex spring constant), with respect to the vibrations with frequencies up to about 500 Hz.

It follows from the above description that the instant upper support 18 is capable of providing a sufficiently lowered dynamic spring constant over a considerably wide frequency range of vibrations, thereby effectively isolating or damping vibrations and noises such as road-oriented noises during running of the vehicle, and assuring improved driving comfort of the vehicle.

The instant upper support 18 can exhibit a low dynamic spring constant as described above, based on the fluid flows which occur upon application of vibrations. Since the dynamic spring constant is lowered with respect to only the input vibrations of a relatively high frequency range, it is possible to design the rubber bodies 14, 16 so as to have a sufficient degree of static spring stiffness, so that the upper support 18 stably withstands a static load received from the shock absorber. Thus, the instant upper support 18 also assures excellent steering stability of the vehicle.

Figure 5:
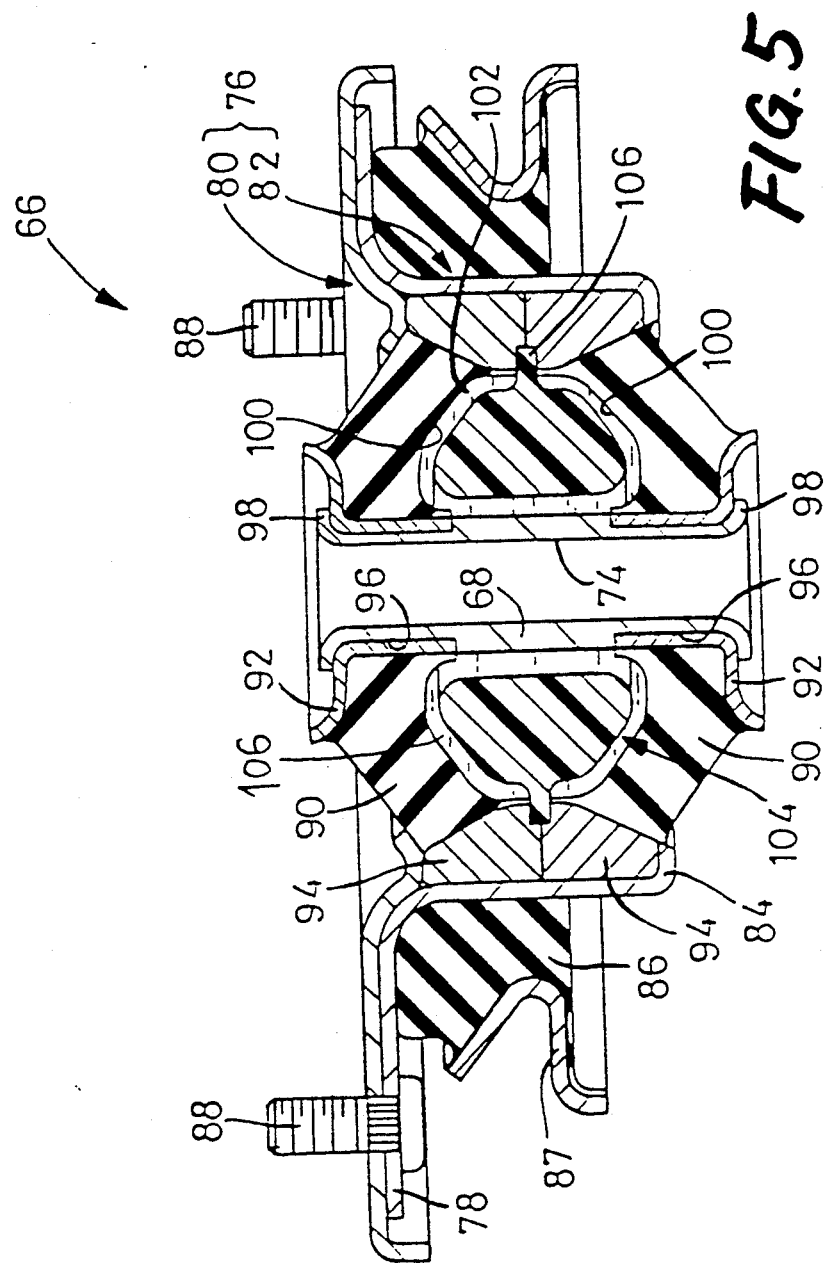
FIG. 5 is an elevational view in axial cross section of another embodiment of the upper support according to the present invention.

Referring next to FIG. 5, there is shown another preferred embodiment of the present invention, in the form of an upper support 66 used in a rear axle suspension system of a motor vehicle.

In FIG. 5, reference numeral 68 denotes a cylindrical inner rigid member in the form of an inner metal member 68. The inner metal member 68 is fixed to a shock absorber of the suspension system, such that a piston rod (not shown) of the shock absorber is inserted through and fixedly received in a center bore 74 formed through the inner metal member 68.

Radially outwardly of the inner metal member 68, there is disposed a generally cylindrical outer rigid member in the form of an outer metal member 76, which is located substantially coaxially with the inner metal member 68, with a suitable spacing therebetween. The outer metal member 76 consists of a generally annular metal plate 80, and a cylindrical member 82. The cylindrical member 82 has an outward flange 78 at one of the axially opposite ends thereof adjacent to the annular metal plate 80, and a caulked portion 84 at the other axial end. The annular metal plate 80 and the cylindrical member 82 are fixed together into the outer metal member 76, such that the outward flange 78 and the annular metal plate 80 are superposed on and fixed to each other, as shown in FIG. 5. To the outer circumferential surface of the outer metal member 76, there is elastically connected through a rubber body 86 a support member 87 to which is connected one end of a spring which is used in the suspension system. In FIG. 5, reference numerals 88 denote mounting bolts for fixing the outer metal member 76 to the vehicle body.

Between the inner and outer metal members 68, 76, there are interposed a pair of elastic bodies in the form of generally annular rubber bodies 90, 90, which are adapted to elastically connect the inner and outer metal members 68, 76. Each of the rubber bodies 90, 90 is secured at its inner and outer circumferential surfaces to a generally cylindrical inner support member 92 and a generally cylindrical outer support member 94, respectively, by means of vulcanization. The inner support members 92, 92 are fitted on the axially opposite end portions of the inner metal member 68, while the outer support members 94, 94 are fitted in the outer metal member 76, so that the pair of rubber bodies 90, 90 are disposed on the axially opposite sides of the upper support 66 while being interposed between the inner and outer metal members 68, 76.

More specifically, the inner metal member 68 has two recessed portions 96 formed in the outer circumferential surfaces of the axially opposite end portions thereof on which the inner support members 92 are fitted. Each of the inner support members 92 is held in pressed contact with an inner axial end face of the corresponding recessed portion 96 and a caulked portion 98 formed at the extreme end of the corresponding axial end portion of the inner metal member 68, so as to partially define the recessed portion 96. Thus, the inner support members 92 are fixedly supported by the inner metal member 68. On the other hand, the outer support members 94, 94 are axially superposed on each other, and gripped by and between a radially inner portion of the annular metal plate 80 and the caulked portion 84 of the cylindrical member 82. Thus, the axially superposed outer support members 94, 94 are fixedly supported by the outer metal member 76.

Each one of the rubber bodies 90, 90 has an annular recess 100 which is open in the axial direction of the upper support 18 toward the other rubber body 90, and which extends over the entire circumference of the rubber body 90. With the rubber bodies 90, 90 being assembled with the inner and outer metal members 68, 76 as described above, a fluid-tightly enclosed annular fluid chamber 102 is defined by the axially opposed surfaces of the annular recesses 100 of the rubber bodies 90, 90 and the outer circumferential surface of an axially intermediate portion of the inner metal member 68.

As in the preceding embodiment of FIG. 1, the fluid chamber 102 is filled with a suitable non-compressible fluid having relatively low kinematic viscosity, and an annular resonance block 104 is accommodated within the fluid chamber 102. Like the resonance block 62, the resonance block 104 has an outer configuration which is substantially similar to the inner shape of the fluid chamber 102. Further, the resonance block 102 has a fixed portion 106 formed at its outer periphery, such that the fixed portion 106 is axially gripped by the superposed outer support member 94, 94. In this arrangement, the resonance block 104 is placed in an axially and radially intermediate position of the fluid chamber 102 when the upper support 66 is installed on the motor vehicle.

In the thus constructed upper support 66, too, a resonance portion 106 is defined between the resonance block 104 and the inner wall surface of the fluid chamber 102, so that the fluid in the fluid chamber 102 is forced to flow through the resonance portion 106, when a dynamic vibrational load is applied between the inner and outer metal members 68, 76. Accordingly, like the upper support 18 of the preceding embodiment of FIG. 1, the instant upper support 66 provides a sufficiently lowered dynamic spring constant, based on the fluid flows through the resonance portion 106 of the fluid chamber 102, so as to exhibit excellent vibration-isolating capability, while assuring a sufficiently high static spring constant for improved steering stability of the vehicle.

While the present invention has been described in its presently preferred embodiments, for illustrative purpose only, it is to be understood that the invention is not limited to the details of the illustrated embodiments, and the invention may be otherwise embodied.

While the upper supports 18, 66 of the illustrated embodiments have the respective fluid chambers 60, 102, which are formed over the entire circumferences thereof, the fluid chamber formed in the upper support of the present invention does not necessarily extend over the entire circumference of the upper support. Further, the fluid chamber may be divided by a suitable partition structure into a plurality of fluid chambers independent of each other.

The specific configuration of the resonance blocks 62, 104 accommodated within the fluid chambers 60, 102 may be suitably changed according to the shape of the fluid chambers 60, 102. Further, the resonance block 62, 104 may consist of a plurality of divided sections, for example, two semiannular halves, which are arranged in the circumferential direction.

The resonance blocks 62, 104 may be supported by the inner metal members 10, 68, instead of the outer metal members 12, 76.

Although other specific modified embodiments are not described herein, it will be understood that the invention may be embodied with various other changes, modifications and improvements, which may occur to those skilled in the art, without departing from the spirit and scope of the invention defined in the following claims.

What is claimed is:

1. An upper support for a suspension system, which is interposed between a body of a vehicle and a shock absorber of the vehicle, for elastically connecting the vehicle body and the shock absorber, comprising:

a generally cylindrical inner rigid member to which said shock absorber is fixed;

a generally cylindrical outer rigid member which is disposed radially outwardly of said inner rigid member and fixed to said body of the vehicle;

at least one generally annular elastic body interposed between said inner and outer rigid members for elastically connecting the inner and outer rigid members, said at least one elastic body at least partially defining at least one fluid chamber which is filled with a non-compressible fluid and which is subject to a dynamic vibrational load that is applied between said inner and outer rigid members; and at least one resonance member each of which is accommodated in the corresponding one of said at least one fluid chamber, each said resonance member having an outer configuration substantially corresponding to an inner shape of said corresponding one fluid chamber, and being secured to one of said inner rigid member and said outer rigid member, each said resonance member cooperating with an inner wall surface of the corresponding fluid chamber to define a resonance portion which has predetermined dimensions, and through which said non-compressible fluid is forced to flow upon application of said dynamic vibrational load.

2. An upper support according to claim 1, wherein said at least one fluid chamber comprises a single annular fluid chamber which is located adjacent to a portion of said at least one generally annular elastic body between said inner and outer rigid members, and wherein said at least one resonance member comprises a single annular member which is accommodated within said single annular fluid chamber.

3. An upper support according to claim 2, wherein said at least one generally annular elastic body comprises a first elastic body and a second elastic body, one of said first and second elastic bodies having an annular recess which is open toward the other of said first and second elastic bodies in the axial direction of the upper support, and which is substantially closed by said other elastic body to provide said single annular fluid chamber.

4. An upper support according to claim 3, further comprising an inner support member and an outer support member for supporting said other elastic body, such that said inner and outer support members are respectively fixed to said inner and outer rigid members to connect said other elastic body to the inner and outer rigid members.

5. An upper support according to claim 2, wherein said at least one generally annular elastic body comprises a pair of elastic bodies each one of which has an annular recess which is open toward the other elastic body in the axial direction of the upper support, said single annular fluid chamber being at least partially defined by said annular recesses of said pair of elastic bodies.

6. An upper support according to claim 5, further comprising a pair of inner support members and a pair of outer support members for supporting said pair of elastic bodies, such that said pair of inner support members are fixed to said inner rigid member, while said pair of outer support members are fixed to said outer rigid member, so as to connect said pair of elastic bodies to the inner and outer rigid members.

7. An upper support according to claim 1, wherein said non-compressible fluid has a kinematic viscosity of not higher than 1000 centistokes.

8. An upper support according to claim 7, wherein said non-compressible fluid has a kinematic viscosity of not higher than 500 centistokes.

9. An upper support according to claim 8, wherein said non-compressible fluid has a kinematic viscosity of not higher than 100 centistokes.

10. An upper support according to claim 1, wherein said predetermined dimensions of said resonance portion are determined so that the upper support exhibits an absolute value of complex spring constant lower than 200 kgf/mm, with respect to the dynamic vibrational load having frequencies up to 500 Hz.

* * * * *